Figure 1:
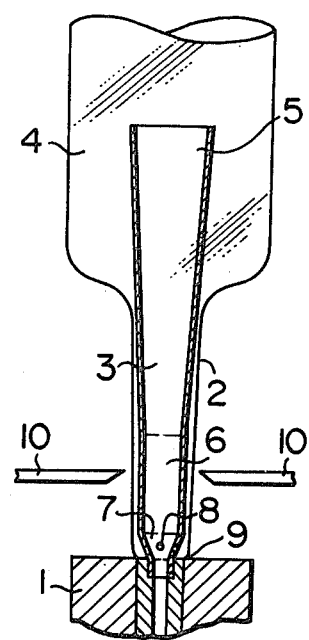

United States Patent [19]

Ushioda et al.

[11] 4,204,819
[45] May 27, 1980

[54] SHAPING APPARATUS FOR TUBULAR FILM

[75] Inventors: Katsuyoshi Ushioda, Tokyo; Fumio Imaizumi, Chibaken, both of Japan

[73] Assignee: Idemitsu Petrochemical Co. Ltd., Tokyo, Japan

[21] Appl. No.: 884,079

[22] Filed: Mar. 6, 1978

[51] Int. Cl.² .............................................. B29D 7/22
[52] U.S. Cl. ................................. 425/72 R; 264/565; 425/326.1
[58] Field of Search ............ 264/95, 209, 89, 563–566, 264/569; 425/326.1, 72

[56] References Cited

U.S. PATENT DOCUMENTS

| 2,987,767 | 6/1961 | Berry et al. | 264/95 |
| 3,092,874 | 6/1963 | Fallwell | 264/95 |
| 3,560,600 | 2/1971 | Gliniecki | 264/209 |

FOREIGN PATENT DOCUMENTS

| 2631631 | 2/1977 | Fed. Rep. of Germany | 264/95 |
| 49-61252 | 6/1974 | Japan . | |
| 52-19762 | 2/1977 | Japan . | |
| 52-102375 | 8/1977 | Japan . | |
| 52-102376 | 8/1977 | Japan . | |

Primary Examiner—Jeffery R. Thurlow
Attorney, Agent, or Firm—Fred Philpitt

[57] ABSTRACT

Tubular films having superior mechanical properties and extremely small deviation in thickness can be produced according to a method and an apparatus in which a means of downwardly tapered hollow inverted-truncated-conical shape is placed on the top of an annular die and used as a means for stabilizing bubbles of olefinic polymer synthetic resins which are extruded from the annular die in an air-cooling inflation process with a take-up speed of about 5 m to 50 m per minute.

2 Claims, 2 Drawing Figures

SHAPING APPARATUS FOR TUBULAR FILM

DESCRIPTION OF THE INVENTION

This invention relates to a method for shaping tubular films of olefinic polymer synthetic resin having superior mechanical strengths. More particularly, it relates to a method for shaping tubular films by extruding molten olefinic polymer synthetic resin into a funnel-shape according to air-cooling inflation process with a take-up speed of from about 5 m to 50 m per minute in which method a downwardly tapered means (having an upwardly enlarged diameter) placed on the top of an annular die is used as a means for stabilizing resin bubbles.

It has been known heretofore that a method for shaping tubular film by extruding molten olefinic polymer synthetic resin into a funnel-shape according to air-cooling inflation process (the shape being formed by extruding a tubular film in a diameter same with the diameter of an annular die lip for a while and then inflating it to a tubular film of a diameter greater than that of the die lip as shown in Figure attached herewith will be referred to as funnel-shape) is a method for shaping tubular films having well-balanced mechanical strengths both in logitudinal and transversal directions and superior impact strength. However, there is a problem in this shaping method, particularly when shaping is carried out with a high blow-up ratio of 3.0 or more, in that a resin bubble of funnel-shape, formed on the top of an annular die fluctuates and uniform cooling thereof cannot be carried out and on this account, deviation in thickness, wrinkles and slackening are formed, folded width becomes non-uniform and the balance of mechanical strengths both in longitudinal and transversal directions becomes worse. In order to solve this problem, there has been known a method for preventing fluctuation of resin bubbles, in which method an inside mandrel is disposed on the top of an annular die and the inside of a tubular film inflated by a pressurized air is caused to be moved along the circumferential wall of this inside mandrel. However, according to this method there is a drawback in that the circumferential wall of the inside mandrel is rubbed with the inside of the tubular film by which numberless flaws are formed on the inside surface of the tubular film and the mechanical strength of resultant tubular films is reduced. Further, there is a method for preventing the fluctuation of inflation bubbles by mounting a cylindrical bubble stabilizing means having a diameter not greater than the inside diameter of a die lip, on the top of an annular die and allowing a tubular film to contact or to come near the outer circumferential surface of this stabilizing means for resin bubbles in inflation. When a take-up speed of the tubular film is about 50 m per min. or more, the resin bubbles can be maintained in the stabilized state but as the take-up speed of a tubular film becomes as relatively slow as 50 m/min. or lower there is accompanied a drawback in that the part of the tubular film before starting of inflation leaves the outer circumferential surface of the stabilizing means for resin bubbles and the fluctuation of resin bubbles cannot be prevented.

Accordingly, we have made a comprehensive study about the shape of a stabilizing means for resin bubbles and as the result thereof we have completed the method and apparatus of the present invention.

The present invention resides in a method for shaping olefinic polymer synthetic resins into tubular films by melt-extrusion into an upwardly opened funnel-shape according to an air-cooling inflation process with a take-up speed of about 5 m to 50 m per minute, said method comprises extruding a tubular molten film from an annular die so as to be drawn upward along the upwardly expanding (downwardly tapered) outer surface of the top part of an elongated stabilizing means of resin bubbles mounted on and connected with the top of said annular die coaxially therewith without contacting said outer surface while keeping a distance from the portion of the extrudate before starting of inflation to said outer surface as close as possible, said stabilizing means consisting of the base part (a), the rising part (b) and the top part (c) or the base part (a) and the top part (c), said base part (a) having an outside diameter further smaller than the inside diameter of the die lip, said rising part (b) having a uniform outside diameter nearly same with the inside diameter of the die lip and said top part (c) having an upwardly enlarged diameter and opening on the upper end, said base part (a) being provided with holes in the viscinity of its circumferential wall to allow them to communicate with the upper opening of said stabilizing means and inflating the tubular film by air.

Figure 2:
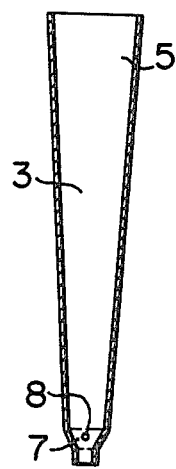

The present invention will be described more concretely according to accompanying drawings in which FIG. 1 is a schematic cross-sectional view of a stabilizing means for resin bubbles used in the practice of the present invention and FIG. 2 is also a schematic cross-sectional view of a stabilizing means for resin bubbles, having no rising part.

In FIG. 1, a tubular film 2 extruded from an annular die 1 in the molten state slightly expands by the pressurized air in the inside of the tubular film 2 immediately after issued from a die lip 9 and while being cooled with the cooling air blown from an air-cooling ring 10, it ascends along the rising part 6 of a stabilizing means 3 for resin bubbles without contacting therewith. During this ascending movement, the thinning and crystal orientation of the tubular film 2 proceed. The thinned tubular film is caused once to come close to the tapered surface of the top 5 of the stabilizing means 3 for resin bubbles as much as possible by the cooling air, then initiates suddenly inflation by pressurized air to form a funnel-shape resin bubble 4 and then taken up by being pinched with pinch rolls (not shown) provided over the annular die 1. In inflating a tubular film formed by melt-extrusion, into a funnel-shape as shown in FIG. 1, regardless to say, it is easily possible to adjust shaping conditions e.g. take-up speed, extruder output, blow-up ratio, amount of flow of cooling air, temperature of annular die depending upon the physical properties of the molten state of olefinic polymer synthetic resin used.

The take-up speed of a tubular film is about 5 m to 50 m per minute in the present invention. This is the range of values which are often employed in case of shaping of films having a large thickness or a large folded width and also in case of small capacity of an extruder. A take-up speed less than about 5 m/min. is not preferable from the production efficiency of tubular films and a take-up speed greater than about 50 m/min. is not preferable either because molten extruded tubular films tend to adhere to the tapered outer surface of the top part of the stabilizing means for resin bubbles.

The function and effectiveness of the stabilizing means for resin bubbles of the present invention will be described. Firstly, as shown in FIG. 1, since the base part 7 thereof has an outside diameter further smaller than the inside diameter of a die lip 9, the tubular film 2 immediately after being melt-extruded will not adhere to the base part 7. Further, since there are a plurality of holes 8 communicating with the opening of the top part 5, in the viscinity of the circumferential wall of the base 7, there is formed a kind of suction effect between the inside and outside of the holes 8 at the time when a tubular film is taken up and on this account there is formed a descending flow of pressurized air directing from the top opening side to the holes 8 in the inside of the stabilizing means 3 for resin bubbles and at the same time, the pressurized air leaving the holes 8 forms an ascending flow along the outer circumferential surface of the stabilizing means 3 of resin bubbles by being accompanied with the ascending tubular film. It is observed that this ascending flow of pressurized air prevents the tubular film from contacting the outer circumferential surface of the stabilizing means for resin bubbles.

Further since the top part 5 of the stabilizing means is of an elongated inverted truncated conical shape having an opening on the upper end, even in case of relatively lower take-up speed of a tubular film, the fluctuation of resin bubble can be prevented. Namely, a tubular film formed by melt-extrusion tends to be drawn upward while forming gradually and upwardly enlarged cylindrical shape when a take-up speed is relatively lower. Thus if such a part of tubular film corresponding to that before initiation of inflation is caused to approach the gradually and upwardly enlarged outer surface of a stabilizing means of resin bubble while controlling the flow amount of cooling air and then said tubular film is inflated to form resin bubble, the fluctuation of resin bubbles can be prevented.

In the present invention, it is common to select a ratio of the height of stabilizing means of resin bubbles to the height of the top part of said stabilizing means in the range of about 100:50–90. In FIG. 2, there is shown the cross-section of a stabilizing means for resin bubbles, having the above-mentioned ratio of about 90 and no rising part 6.

The top part of the stabilizing means for resin bubbles of the present invention forms an elongated inverted truncated conical shape having gradually enlarged diameter and an opening on the upper end, but as for the angle of inclination of generating line of tapered outer surface to a central axis, it is preferable to select an angle less than about 15° preferably about 2° to 5°. This stabilizing means of resin bubbles is, regardless to say, of rotationally synmetrical about the central axis.

In the present invention, as olefinic polymer synthetic resin or polyolefin type synthetic resin, a high density polyethylene, a low density polyethylene or a polypropylene can be used. Particularly, a high density polyethylene having a lower melt index is suitable because it forms a funnel type resin bubble easily.

The tubular films obtained according to the method of the present invention show extremely small deviation in thickness and superior mechanical properties.

The present invention will be more concretely illustrated by way of specific examples and a comparative example but it is not intended to limit the scope of the present invention by these examples. Examples 1–3

High density polyethylene having a weight average molecular weight of 530,000 and a melt index of 0.05 was extruded in molten state by using an extruder having an inside diameter of cylinder of 50 mm and a L/D ratio of screw of 28 through a spiral type die mounted on the end of said extruder upward in the funnel-shape to form into a tubular film according to air-cooling inflation process, said die having a die slit of 0.5 mm and a die lip inside diameter of 75 mm.

The stabilizing means for resin bubbles, used had a shape shown in FIG. 1. Those having a height from the top surface of this annular die to the upper end of the stabilizing means for resin bubbles, of 700 mm and the height of the top part of the stabilizing means for resin bubbles, of 500 mm and an angle of inclination of generating line of the gradually enlarged surface of the top part to the central axis, of 3° 30', outside diameter of the rising part of 75 mm, the outside diameter of the base part contacting the top surface of the annular die of 40 mm, eight holes of a diameter of 5 mm.

As the shaping conditions of tubular films, an extruder output of 22 Kg/hour, an annular die temperature of 250° C., a blow-up ratio of 4.2 were set. Depending upon the take-up speed of tubular films of 39 m/min., 19 m/min. and 13 m/min., cooling air was adjusted and the lengths of the tubular film corresponding to the part before initiation of inflation were set to be 380 mm, 400 mm and 430 mm, respectively. The clearance between a tubular film and the upwardly enlarged outer surface of stabilizing means for resin bubbles could be made to be 0.2 mm and no fluctuation of resin bubbles was observed.

With regard to the tubular films thus obtained, various physical properties were measured and the results thereof are shown in Table 1.

Table 1

| Example | 1 | 2 | 3 |
|---|---|---|---|
| Take-up speed (m/min.) | 39 | 19 | 13 |
| Thickness of film (micron) | 11 | 20 | 30 |
| Deviation in thickness (micron) | ±1.0 | ±1.5 | ±2.0 |
| Yield strength (Kg/cm$^2$)* | | | |
| longitudinal direction | 347 | 267 | 256 |
| transversal direction | 284 | 272 | 282 |
| Elmendorf's tear strength* (Kg/cm) | | | |
| longitudinal direction | 4.7 | 6.9 | 10.6 |
| transversal direction | 114 | 108 | 61.4 |
| Impact strength (Kg.cm/cm) | 2,760 | 2,650 | 2,410 |

(*measured according to JIS 1702 - 1962)

EXAMPLES 4 and 5

The procedure same with that of the foregoing examples was carried out except that extruder output was changed, blow-up ratio was set at 5.5, cooling air was adjusted according to the take-up speed of tubular films of 46 m/min. and 27 m/min., and the lengths of the tubular films corresponding to the part before initiation of inflation were set to 580 mm and 500 mm, respectively. The results are shown in Table 2.

COMPARATIVE EXAMPLE

Shaping of tubular films was carried out as in Example 5 but without using a stabilizing means for resin bubbles. However, the fluctuation of resin bubble was so violent that shaping was extremely difficult.

The thickness of resulting tubular films was 11 micron but the deviation in thickness was so large as ±8 micron that the measurement of physical properties was omitted.

Table 2

| Example | 4 | 5 | Comparative example |
|---|---|---|---|
| Extruder output (Kg/hour) | 38 | 40 | 40 |
| Take-up speed (m/min.) | 46 | 27 | 27 |
| Thickness (micron) | 10 | 10 | 11 |
| Deviation in thickness (micron) | ±1.0 | ±1.5 | ±8.0 |
| Yield strength (Kg/cm$^2$)* | | | |
| longitudinal direction | 458 | 305 | — |
| transversal direction | 289 | 301 | |
| Elmendorf's tear strength* (Kg/cm) | | | |
| longitudinal direction | 4.5 | 7.0 | — |
| transversal direction | 165 | 108 | |
| Impact strength (Kg cm/cm) | 2,100 | 2,750 | — |

(*measured according to JIS 1702 - 1962)

What is claimed is:

1. An apparatus for shaping olefinic polymer synthetic resins into a tubular film by melt-extrusion into a funnel-like form according to an air-cooling inflation process, said apparatus comprising:
   (i) an extrusion die having a circumferential opening through which the resin melt may be extruded, and
   (ii) an elongated film stabilizing means extending coaxially upwardly from and connected with the top of said extrusion die, said elongated film stabilizing means comprising
      (a) a first section having a bottom end and a top end, and an intermediate wall portion extending between said bottom and top ends,
      (b) a second section having a bottom end and a top end and an intermediate wall portion extending between said bottom and top ends in an upwardly diverging direction, said first and second sections being further characterized by the fact that
         (1) said second section is positioned above said first section and is joined thereto,
         (2) the angle of divergence of the wall portion of said second section being in the range of about 2° to about 15° with the central axis of said elongated film stabilizing means,
         (3) the vertical height of said second section being greater than the vertical height of said first section,
         (4) the bottom end of said second section has an outer diameter which is nearly the same as the inside diameter of said circumferential opening in said extrusion die,
         (5) said first section having a plurality of laterally extending holes located at spaced apart intervals around its circumference,
         (6) said first section having a bottom end diameter that is smaller than the inside diameter of said circumferential opening of said extrusion die,
         (7) the top end of said second section being open whereby when a tubular plastic film is extruded upwardly through the circumferential opening of said extrusion die a descending flow of pressurized air is formed that passes downwardly through said open top end of said second section and laterally outwardly through said plurality of holes in said first section, and vertically upwardly between the exterior surfaces of said first and second sections and the interior of the freshly extruded tubular film.

2. An apparatus according to claim 1 wherein said first and second sections are joined together by an elongated third section that is cylindrical in shape.

* * * * *